Feb. 7, 1967 KENICHI ISODA ETAL 3,302,459

DEVICE FOR ADMITTANCE MEASUREMENTS BY CONVERTING ADMITTANCE INTO DIRECT CURRENT

Filed Oct. 15, 1964 3 Sheets-Sheet 1

INVENTOR.
Kenichi Isoda
Naoya Ono

BY

Meston & Meston

INVENTOR.
Kenichi Isoda
Naoya Ono

BY

Mesten & Mesten

INVENTOR.
Kenichi Isoda
Naoya Ono

BY

Marken & Mestern

United States Patent Office 3,302,459
Patented Feb. 7, 1967

3,302,459

DEVICE FOR ADMITTANCE MEASUREMENTS BY CONVERTING ADMITTANCE INTO DIRECT CURRENT

Kenichi Isoda, Kokubunji-machi, and Naoya Ono, Kodaira-shi, Japan, assignors to Kabushiki Kaisha Hitachi Seisakusho, Tokyo-to, Japan, a joint-stock company of Japan Filed Oct. 15, 1964, Ser. No. 404,066
Claims priority, application Japan, Oct. 18, 1963, 38/54,959
2 Claims. (Cl. 73—304)

This invention relates to a new device for converting an admittance into a direct-current signal proportional thereto.

In a conventional self-balancing recorder, in general, since a wire-wound slide potentiometer is used for the feedback element, the life of the slide potentiometer is short because of frictional wear of the sliding contact parts, and the required torque of the servomotor is high because of the existence of frictional torque.

It is an object of the present invention to eliminate these disadvantages by providing a device in which a differential air capacitor is used as an admittance element, whereby angular displacement is converted into a D.-C. current signal, said device being usable for the feedback element of a self-balancing recorder of the above mentioned character.

Furthermore, in the measurement by electrostatic capacitance of liquid level according to the heretofore known art, there has been no converter for converting electrostatic capacitance variation of several tens of pf. into a large D.-C. current. Consequently, the available sensitivity has been low.

Accordingly, it is another object of the invention to provide a device whereby a conversion sensitivity of the order of 3 ma./100 pf. can be readily obtained.

The above stated objects, as well as other objects and advantages have been achieved by the present invention, according to which there is provided a device for converting an admittance into a direct current signal, which comprises an alternating-current voltage at its primary side by said alternating-current power source and having at least one pair of secondary windings, a device for applying, to an admittance element to be measured, voltages produced in said secondary windings in accordance with said alternating-current voltage alternately for each of mutually different half cycles, and means to measure current flowing through said secondary windings.

The nature, principle, utility, and details of the invention will be more clearly apparent by reference to the following description with respect to a preferred embodiment of the invention and examples of practical application thereof, taken in conjunction with the accompanying drawings throughout which like parts are designated by like reference characters, and in which:

FIG. 1 is a schematic connection diagram of the fundamental circuit according to the invention;

FIGS. 2(*a*)–(*d*) are time charts indicating waveforms of operational variables at various parts of the circuit shown in FIG. 1;

FIGS. 3 and 5 are circuit diagrams of preferred embodiments of the invention;

FIGS. 4(*a*)–(*e*) are time charts indicating waveforms of operational variables at various parts of the circuit shown in FIG. 3;

Figure 1:
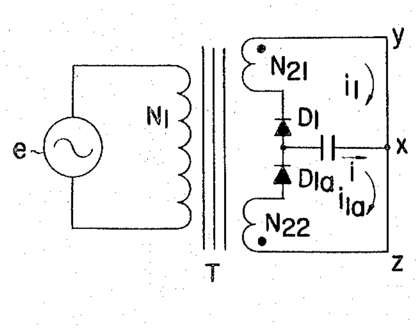
Figure 2A:
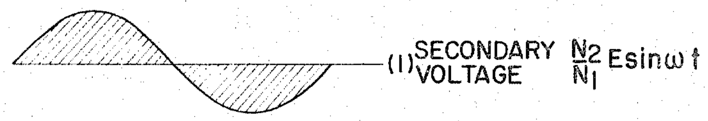
Figure 2B:
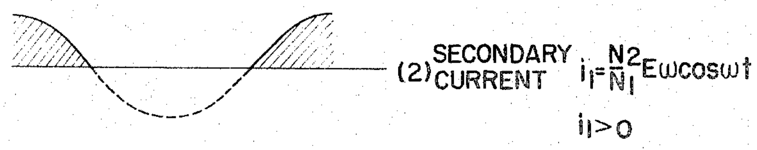
Figure 2C:
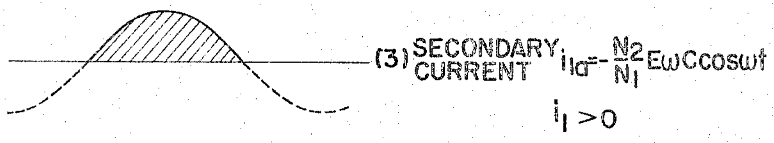
Figure 2D:
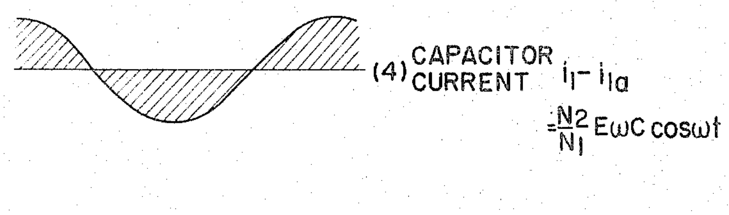

Referring first to FIG. 1, there is shown the fundamental circuit of the admittance to a direct current converter according to the invention illustrating the case wherein a capacitor C is used for the element to be converted. In this device, power is supplied from an A.-C. voltage source $e$ through a transformer T having a primary winding $N_1$ and secondary windings $N_{21}$ and $N_{22}$. Diodes $D_1$ and $D_{1a}$ are connected in series in the same direction and connected between the secondary windings $N_{21}$ and $N_{22}$. The aforesaid capacitor C is connected between the junction point of the diodes $D_1$, $D_{1a}$ and the junction point of the secondary windings $N_{21}$ and $N_{22}$.

Voltage and current waveforms occurring at various parts of this circuit are indicated in FIGS. 2 in which 2(*a*) represents the voltage produced in the secondary winding $N_{21}$ or $N_{22}$; 2(*b*) represents the current passing through the diode $D_1$ and flowing to the capacitor C; 2(*c*) represents the current passing through the diode $D_{1a}$ and flowing to the capacitor C; and 2(*d*) represents the resulting current $i$ which flows through the capacitor C in the same manner as in the case where a secondary winding is singly and directly connected to the two ends of the capacitor C. The current $i$ may be expressed by the following equation $$i=\frac{N_2}{N_1}E\omega C\cos\omega t \qquad (1)$$

where:

$N_1$ is the number of turns of the primary winding;
$N_2$ is the number of turns of each of the secondary windings $N_{21}$ and $N_{22}$; and
$e$ is the source voltage ($e=E\sin\omega t$).

The current $i_1$ between the points $x$ and $y$ and the current $i_{1a}$ between the points $x$ and $z$ in the circuit shown in FIG. 1 become half-wave rectified currents of mutually opposite polarity. The mean values $\bar{i}_1$ and $\bar{i}_{1a}$ of these currents can be expressed by the following equation.

$$\bar{i}_1=\overline{i_{1a}}=\frac{1}{2\pi}\int_{2}^{\frac{\pi}{2}}\frac{N_2}{N_1}E\omega C\cos\omega t d(\omega t)=\frac{1}{\pi}\frac{N_2}{N_1}E\omega C \qquad (2)$$

As is apparent from this result, the current $\bar{i}_1$ or $\bar{i}_{1a}$ becomes a current which is proportional to the admittance $j\omega C$ of the capacitor C. That is, a circuit as shown in FIG. 1 becomes an admittance to the direct current converter in which an A.-C. current is caused to flow through an admittance element constituting the object to be measured, and the output becomes a D.-C. current (half-wave rectified current).

Figure 3:
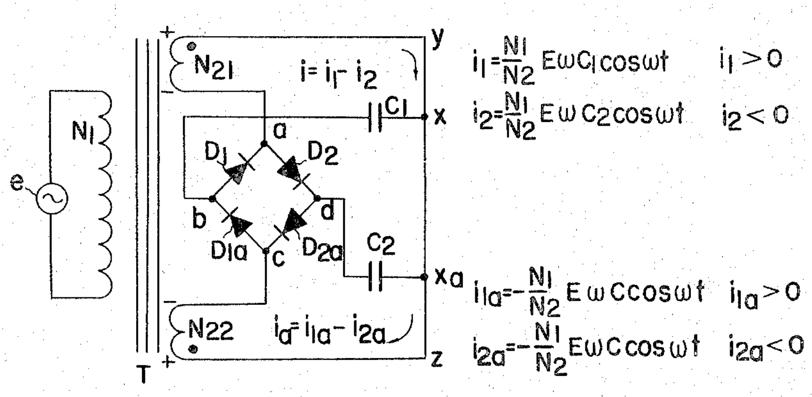

FIG. 3 shows one preferred embodiment of the invention which is a circuit for obtaining a D.-C. current proportional to the difference between the admittances of two capacitors $C_1$ and $C_2$. In this case, diodes $D_1$ and $D_2$ and diodes $D_{1a}$ and $D_{2a}$ are arranged in bridge connection with junctions *a*, *b*, *c*, and *d*. The secondary winding $N_{21}$ of the transformer T and the capacitor $C_1$ are connected in series between the junctions *a* and *b*, and the secondary winding $N_{22}$ of the transformer T and the capacitor $C_2$ are connected in series between the junctions *c* and *d*. The terminals of the capacitors $C_1$ and $C_2$ connected to their respective transformer secondary windings are commonly connected. The other reference characters designate components similar to those so designated in FIG. 1.

This circuit arrangement is equivalent to the result of differentially combining two of the circuits shown in FIG. 1. That is, the resulting circuit is one wherein a circuit composed of diodes $D_2$ and $D_{2a}$ and the capacitor $C_2$ is differentially connected with respect to a circuit composed of diodes $D_1$ and $D_{1a}$ and the capacitor $C_1$, the secondary windings $N_{21}$ and $N_{22}$ being used commonly in both of these circuits. Accordingly, the voltage and current waveforms at various parts of this resulting circuit can be described similarly as in the case shown in FIG. 1.

Figures 4A, 4B, 4C, 4D, 4E:
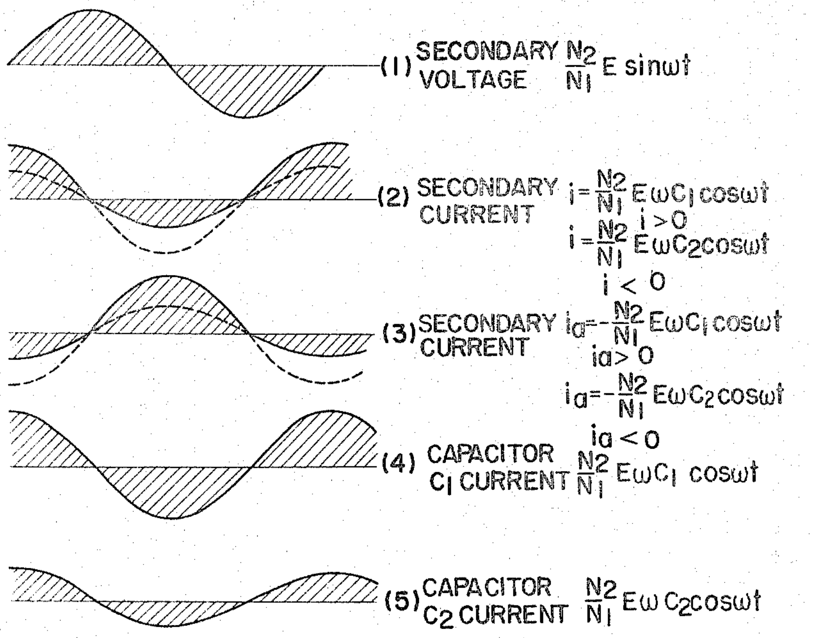

Such waveforms applicable to the circuit shown in FIG. 3 are shown in FIGS. 4, in which 4(*a*) represents the voltage produced in the secondary windings $N_{21}$ and $N_{22}$, the magnitude of said voltage being representable by $$\frac{N_2}{N_1}E \sin \omega t$$

In the half cycle in which the voltage is produced in the indicated direction in the secondary windings $N_{21}$ and $N_{22}$, currents flow in the closed path of $z$–$x_a$–$d$–$c$ and the closed path of $y$–$x$–$b$–$a$. The current $i$ flowing between points $y$ and $x$ and the current $i_{1a}$ flowing between points $z$ and $x$ may be, respectively, expressed by the following equations.

$$\left.\begin{aligned} i_1 &= \frac{N_2}{N_1}E\omega C \cos \omega t \\ i_{1a} &= -\frac{N_2}{N_1}E\omega C_2 \cos \omega t \end{aligned}\right\} \quad (3)$$

Then, in the half cycle a voltage is produced in the direction reverse to that indicated in the secondary windings flow in the closed path of $a$–$d$–$x_a$–$x$–$y$ and the closed path of $c$–$b$–$x$–$y_a$–$x$. In this case, the currents $i_2$ and $i_{2a}$ flowing between the points $y$ and $x$ and between the points $z$ and $x_a$ respectively have directions opposite to those of the above case and magnitudes of said currents may be expressed by the following equations.

$$\left.\begin{aligned} i_2 &= \frac{N_2}{N_1}E\omega C_2 \cos \omega t \\ i_{2a} &= -\frac{N_2}{N_1}E\omega C_1 \cos \omega t \end{aligned}\right\} \quad (4)$$

As a result, the current between the points $y$ and $x$ assumes one of the waveforms as indicated in FIG. 4(*b*), and the current between the points $z$ and $x_a$ assumes one of the waveforms as indicated in FIG. 4(*c*). The currents flowing through the capacitors $C_1$ and $C_2$ are A.-C. currents as indicated in FIGS. 4(*d*) and 4(*e*), respectively. In this case, the mean values $\bar{i}$ and $\bar{i}_a$ of the currents $i(i_1-i_2)$ and $i_a(i_{1a}-i_{2a})$ flowing during one cycle between the points $y$ and $x$ and between the points $z$ and $x_a$ can be expressed by the following equation.

$$\bar{i}=\bar{i}_a=\frac{1}{\pi}\frac{N_2}{N_1}E\omega(C_1-C_2) \quad (5)$$

That is, the values $\bar{i}$ and $\bar{i}_a$ are each proportional to the difference between the admittances of the two capacitors $C_1$ and $C_2$. Therefore, by smoothing the currents between the points $y$ and $x$ and between the points $z$ and $x_a$ by suitable means, an admittance to the direct current converter can be obtained.

Figure 5:
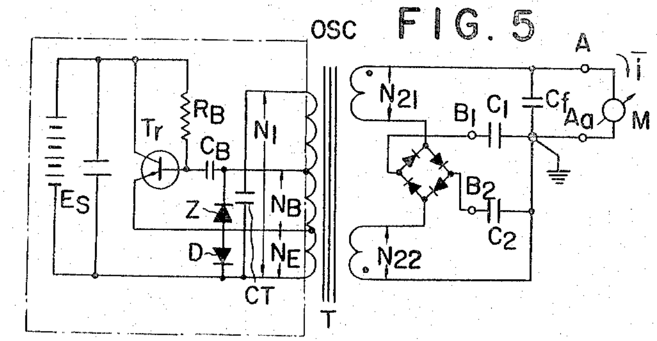

A practical embodiment of the device according to the invention is shown in FIG. 5, in which a Hartley oscillator OSC is used for the power source $e$. In this oscillater, an npn type transistor $Tr$ is provided with a winding $N_E$ of the transformer T connected between the emitter and collector of the transistor and a winding $N_B$ connected between the base and emitter, the windings $N_E$ and $N_B$ being coupled with a coupling coefficient. A capacitor $C_T$ is connected between the collector and base of the transistor. A Zener diode Z and a diode D are connected in series between the base and collector and function to maintain constant the amplitude of the oscillator output voltage.

This oscillator is operated by a direct-current power source $E_S$, and self-bias for the transistor $Tr$ is developed by a resistance $R_B$ and a capacitor $C_B$.

In the above described circuit, the amplitude of the sinusoidal voltage produced between the two ends of the windings $N_B+N_E$ becomes $V_Z+V_D$, where $V_Z$ is the Zener voltage of the Zener diode Z, and $V_D$ is the forward direction voltage of the diode D. Accordingly, a sinusoidal voltage of constant amplitude of a magnitude expressed by $(N_1/N_E+N_B)(V_Z+V_D)$ is developed at the terminals of the winding $N_1$. In this case, it is necessary to establish the condition expressed by $E_S>(V_Z+V_D)$.

The angular velocity $\omega$ of the oscillation of this oscillator OSC can be expressed by the following equation.

$$\omega=\frac{1}{\sqrt{L_1}\sqrt{C_T+\left(\frac{N_2}{N_1}\right)^2(C_1+C_2)}} \quad (6)$$

where $L_1$ is the self-inductance of the winding $N_1$.

The circuit on the secondary side of the transformer T is arranged in the same manner as shown in FIG. 3 with the exception that, between the points corresponding to the points $y$ and $x$ in FIG. 3, there is connected a capacitor $C_f$ for smoothing, across the terminals of which an ammeter M is connected to measure only the direct-current component.

In order to indicate more fully the utility of the present invention, the following description with respect to an example of its practical application to a liquid level gauge of capacitance type is presented hereinbelow. The principle of this application resides in the use, for the capacitor $C_1$, a capacitor whose capacitance varies in accordance with the liquid level to be measured and the use, for the capacitor $C_2$, a capacitor of constant capacitance.

Figure 6:
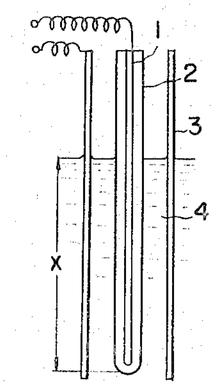
FIG. 6 is an elevational view showing the arrangement of a capacitor for liquid level measurement.

The capacitor whose capacitance is varied in accordance with the liquid level to be measured is arranged and constructed as shown in FIG. 6. This capacitor comprises essentially an internal electrode 1 covered by a suitable dielectric material 2, an external electrode 3 consisting of a metal cylinder, and a conductive liquid 4, for example, water, in which the two electrodes are immersed. When the two electrodes are immersed to a depth $x$, the capacitance $C_x$ between the two electrodes is given by the following equation.

$$C_x=C_o+kx \quad (7)$$

where: $C_o$ is the value of capacitance when the two electrodes are not immersed in the conductive liquid; and $k$ is a constant of proportionality.

Therefore, if this capacitor for measuring a liquid level is used in place of the capacitor $C_1$ in the circuit shown in FIG. 5, and a capacitor of constant capacitance $C_o$ is used in place of the capacitor $C_2$, the main current $\bar{i}$, from Equations 5, 6, and 7, can be expressed by the following equation.

$$\bar{i}=\frac{1}{\pi}\left(\frac{N_2}{N_1}\right)E\frac{kx}{\sqrt{L_1}\sqrt{C_T+\left(\frac{N_2}{N_1}\right)^2(2C_o+kx)}} \quad (8)$$

Then, by suitably selecting the values of $C_T$ and $(N_2/N_1)$ so as to establish the state expressed by $$C_T\gg\left(\frac{N_2}{N_1}\right)^2(2C_o+kx)$$

Equation 8 can be modified as follows:

$$\bar{i}\doteq\frac{1}{\pi}\left(\frac{N_2}{N_1}\right)E\frac{kx}{\sqrt{L_1C_T}} \quad (9)$$

As is apparent from this result, the output current $\bar{i}$ is proportional to the liquid level $x$. In a capacitance type liquid level guage of the above described character, it is possible to cause the proportionality coefficient $$\left(\frac{1}{\pi}\left(\frac{N_2}{N_1}\right)E\frac{k}{\sqrt{L_1C_T}}\right)$$

of the output current $\bar{i}$ and the liquid level $x$ to assume large values, and thereby to obtain high sensitivity, by selecting a large value for the angular frequency of oscillation $$\left(\omega \doteq \frac{1}{\sqrt{L_1 C_T}}\right)$$

Since the aforementioned internal electrode can, therefore, be made thin and light, the gauge device can be miniaturized.

Figure 7:
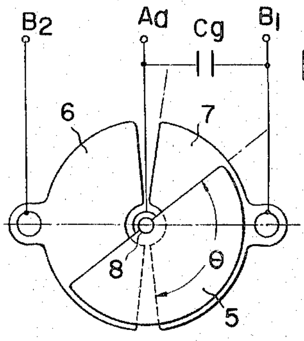
FIG. 7 is an axial view showing a differential capacitor.

In addition to the above described application, the device of this invention is highly suitable for angular displacement to direct current transducers. One example of a differential air variable capacitor for detecting angular displacement is shown in FIG. 7. This capacitor comprises essentially stationary electrodes 6 and 7 fixed in symmetrically opposed positions, a rotatable shaft 8, and a rotary electrode 5 so supported as to be freely rotatable together with the shaft 8. Signal lead-out terminals $B_2$, $A_2$, and $B_1$ are connected to electrodes 6, 5, and 7, respectively. For the use of this capacitor in conjunction with the circuit shown in FIG. 5, these terminals $B_2$, $A_a$, and $B_1$ are connected respectively to the terminals or junctions designated by the same reference characters in FIG. 5.

In accordance with the rotational angle $\theta$ (angular displacement) of the rotary electrode 5, the capacitance $C_{1a}$ between the terminals $B_1$ and $A_a$ and the capacitance $C_{2a}$ between terminals $B_2$ and $A_a$ are respectively according to the following equations.

$$C_{1a}=k\theta$$
$$C_{2a}=C_m-k\theta \quad (10)$$

where: $k$ is a constant; and $C_m$ is the maximum capacitance between the electrodes 7 and 5. When a capacitor of constant capacitance $C_g$ is connected between terminals $A_a$ and $B_1$, Equation 10 assumes the following form.

$$C_{1a}=k\theta+C_g$$
$$C_{2a}=C_m-k\theta \quad (11)$$

When these capacitances $C_{1a}$ and $C_{2a}$ are respectively used in place of the capacitors $C_1$ and $C_2$ in FIG. 5, the resulting output current $\bar{i}$ is expressed by the following equation.

$$\bar{i}=\frac{1}{\pi}\frac{N_2}{N_1}E\frac{2k\theta+(C_g-C_m)}{\sqrt{L_1}\sqrt{C_T+\left(\frac{N_2}{N_1}\right)^2 C_g+C_m}} \quad (12)$$

Then, if the value of $C_g$ is so selected that $C_g=C_m$, the following relationship can be obtained.

$$\bar{i}=\frac{1}{\pi}\frac{N_2}{N_1}E\frac{2k\theta}{\sqrt{L_1+2\left(\frac{N_2}{N_1}\right)^2 C_m}} \quad (13)$$

As is apparent from this result, the output current $\bar{i}$ becomes a quantity which is proportional to the rotational angle $\theta$ (angular displacement).

This angular displacement to current transducer can be advantageously applied to various devices. For example, when it is used as the feedback element of a self-balancing type recorder, it becomes possible to eliminate entirely sliding contacts, which is in contrast to the conventional arrangement wherein a wire-wound slide potentiometer is used as the feedback element.

Figure 8:
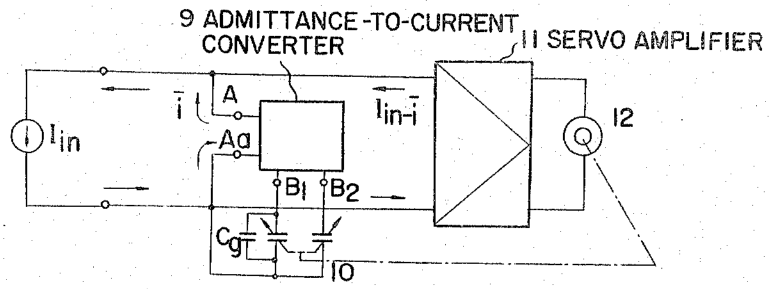
FIG. 8 is a schematic connection diagram of a self-balancing recorder in which the device of the invention is used.

In one example of such application as shown in FIG. 8, an admittance to direct current converter 9 of a circuit arrangement as shown in FIG. 5 is used. In this case, a differential capacitor 10 of the construction indicated in FIG. 7 is used to correspond to capacitors $C_1$ and $C_2$, and its shaft 8 is coupled to the shaft of a servomotor 12. The driving winding of the servomotor 12 is connected to a servo-amplifier 11 of low input impedance, composed principally of a suitable amplifying element such as a vacuum tube or transistor magnetic amplifier.

In the operation of this recorder, the difference $(I_{in}-\bar{i})$ of the input current $I_{in}$ and the output current $\bar{i}$ of the feedback element enters the servo-amplifier 11, where it is amplified, and is applied to the driving winding of the servomotor 12. Accordingly, the servomotor 12 causes the differential capacitor 10 to rotate in the direction which causes the input current $(I_{in}-\bar{i})$ of the servo-amplifier 11 to decrease until the balance point is reached. At the balance point, the following relationship exists.

$$I_{in}=\bar{i}=\frac{1}{\pi}\left(\frac{N_2}{N_1}\right)E\frac{2k\theta}{\sqrt{L_1+2\left(\frac{N_2}{N_1}\right)^2 C_m}} \quad (14)$$

Thus, the rotational angle $\theta$ of the differential capacitor 10 is proportional to the input current $I_{in}$. Therefore, by connecting a recording device to the shaft 8 of the capacitor 10, the current $I_{in}$ can be measured.

A self-balancing recorder in which a differential capacitor of the above character is used as a feedback element, in contrast to a conventional recorder in which a wire-wound slide potentiometer is used as a feedback element, has no sliding parts and, accordingly, has a remarkably long life. Moreover, since the required torque is extremely low, this recorder is advantageous in that its structure can be miniaturized and reduced in weight.

While in the above examples, a description is set forth with respect to the case where a capacitor is used to provide admittance to be converted into direct current, the device of this invention is not limited to this case, other quantities such as a resistance R, for example, being also useable.

If, in the circuit shown in FIG. 1, the capacitor C is replaced by a resistance R, Equation 1 will assume the following modified form.

$$\bar{i}_1=\frac{1}{\pi}\frac{N_2}{N_1}\left(\frac{E}{R}\right) \quad (15)$$

Similarly, if the capacitors $C_1$ and $C_2$ of the circuit shown in FIG. 3 are replaced respectively by resistances $R_1$ and $R_2$, the following equation will be obtained.

$$\bar{i}=\frac{1}{\pi}\frac{N_2}{N_1}E\left(\frac{1}{R_1}-\frac{1}{R_2}\right) \quad (16)$$

Figure 9:
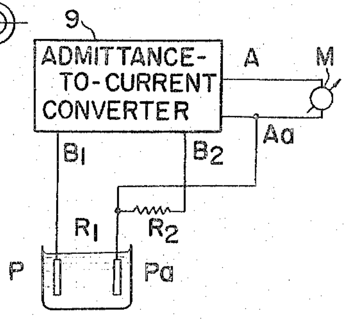
FIG. 9 is a schematic diagram of a conductivity meter in which the device of the invention is used.

A converter in which resistances are used in the above manner can be applied to devices such as conduction meters as illustrated by one example in FIG. 9.

In the arrangement shown in FIG. 9, two electrodes P and $P_a$ are immersed in an electrolytic liquid whose conductivity is to be measured, and the terminals of these electrodes are connected to the terminals $B_1$ and $A_a$ of the admittance to the direct current converter 9 shown in FIG. 5. A fixed resistance $R_2$ is inserted between the terminals $A_a$ and $B_2$, and an ammeter M is connected between terminals A and $A_a$.

In this circuit arrangement, the output current $\bar{i}$ can be expressed by the following equation.

$$\bar{i}=\frac{1}{\pi}\frac{N_2}{N_1}E\left(G_1-\frac{1}{R_2}\right) \quad (17)$$

where $G_1$ is the conductance of the electrolyte $(=1/R_1)$. If $R_2=\infty$, the output current $\bar{i}$ will be proportional to the conductance $G_1$ between the electrodes P and $P_a$. Therefore, if factors such as the shapes of the electrodes and the distance therebetween are kept constant, the output current $\bar{i}$ will be proportional to the conductivity $\delta$ of the electrolytic liquid.

In this case, when small variations of the conductivity of the electrolytic liquid in the vicinity of a specific value are to be measured, the reading fluctuations can be magnified over the full scale of the ammeter M by suitable selection of the value of the resistance $R_2$.

Furthermore, in the case of a conduction meter it is necessary to use an A.-C. current of a frequency which is of the order of a number of kc. or higher in order to avoid an adverse effect of the polarization of the electrolytic liquid. Accordingly, it is necessary to select the oscillation frequency in the circuit shown in FIG. 5 to be of this order. In the instant case particularly, the unique feature of the circuit arrangement whereby A.-C. current is applied between the electrodes P and $P_a$, and the output is a direct current is effectively utilized.

As is apparent from the foregoing description, since A.-C. current flows through the admittance to be measured, and the output current is D.-C. current in the device of this invention, the device is advantageous in that the admittance may be either conductance or susceptance. Furthermore, one of the terminals of the output current and one terminal of the admittance element are commonly connected, and it becomes possible to ground these terminals, so that the device becomes very effective and advantageous in practice.

Another advantage of the device of this invention is that the effect upon the output current of stray static capacity between the two secondary windings of the transformer and the ground is of a small magnitude which is almost negligible and does not become a cause of error, whereby the static shield to be used in the case of use of the device for high frequencies is very simple. Therefore, in the measurement of admittances and other quantities of extremely low static capacity, it is possible to use high frequencies to obtain high sensitivity.

An additional unique feature of the device of this invention is that, by the use of a circuit arrangement as indicated in FIG. 3, it is possible to obtain a D.C. current which is proportional to the difference between two admittances of the same kind. Accordingly, this arrangement can be applied to cases such as that wherein by causing one of the admittances to be a known variable or constant admittance and the other to be an unknown admittance, the value of the unknown admittance is to be measured by the zero-balance method (null-point balance method), or that wherein an output current proportional to the difference between an unknown admittance and a known admittance is to be obtained.

Furthermore, by means of the Hartley oscillator of the grounded collector type as shown in FIG. 5, a sinusodial voltage of constant amplitude can be readily obtained, whereby the device is highly stable. A further advantage is that, by combining the device of the invention with a differential capacitor as shown in FIG. 7, a transducer for transducing angular displacement to current can be readily obtained.

It should be understood, of course, that the foregoing disclosure relates to only a preferred basic embodiment of the invention and a few examples of its applications and that the disclosure is intended to cover all changes and modifications of the examples of the invention herein chosen for the purposes of the disclosure, which do not constitute departures from the spirit and scope of the invention as set forth in the appended claims.

What we claim is:

1. A device for admittance measurements comprising a bridge having arms; a diode inserted in each of said arms for conduction in the same direction; a transformer having a primary winding and a pair of secondary windings; a pair of admittance elements series-connected between a first pair of opposite junction points of said bridge; a reference potential point connected to a point between said elements; a smoothing capacitor; and a direct current meter indicating a value proportional to the difference of admittance of said elements; said secondary windings being connected respectively between one point of a second pair of opposite junction points of said bridge and the reference potential point of said admittance elements and between the other point of said second pair and said reference potential point of said admittance elements, with the ends of said windings connected to said second pair of points being of the same relative polarity at a given instant; and said smoothing capacitor and said direct current meter being connected between said reference potential point and one terminal of one end of said secondary windings connected to said second pair of points.

2. The device as defined in claim 1, wherein one of a pair of admittance elements is a capacitor of constant capacitance; and the other is a capacitor which varies in accordance with a liquid level to be measured.

References Cited by the Examiner

UNITED STATES PATENTS

| | | | |
|---|---|---|---|
| 2,147,726 | 2/1939 | Luck et al. | 324—57 X |
| 2,162,874 | 6/1939 | Wurmser | 324—119 |
| 2,521,522 | 10/1950 | Keitley | 324—119 X |
| 2,722,605 | 11/1955 | Mills et al. | 324—83 |
| 2,939,067 | 5/1960 | Wouk | 324—119 X |
| 2,963,908 | 12/1960 | Shawhan | 73—304 |
| 3,039,051 | 6/1962 | Locher | 324—61 |
| 3,119,267 | 1/1964 | Bartky | 73—304 |
| 3,154,731 | 10/1964 | Sussman et al. | 307—88.5 X |
| 3,176,221 | 3/1965 | Stamler | 324—61 |
| 3,218,548 | 11/1965 | Crafts et al. | 324—57 |

FOREIGN PATENTS

| | | |
|---|---|---|
| 938,099 | 9/1963 | Great Britain. |

WALTER L. CARLSON, *Primary Examiner.*

E. E. KUBASIEWICZ, *Assistant Examiner.*